Sept. 30, 1952   J. V. S. DAHLGREN   2,612,393
SEALING GLAND
Filed March 7, 1947
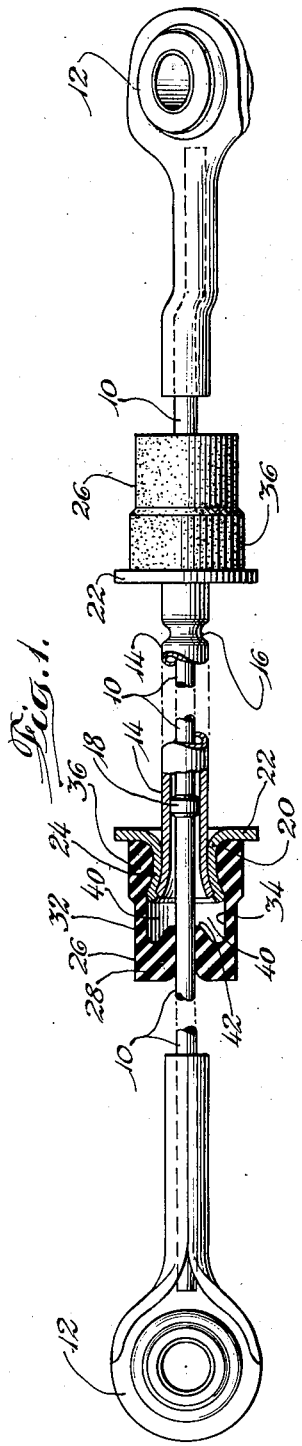
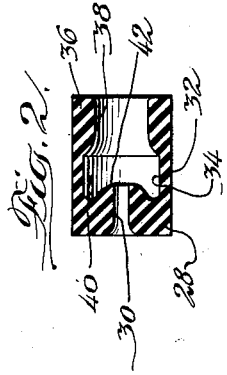
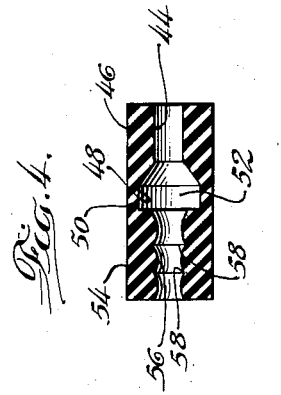
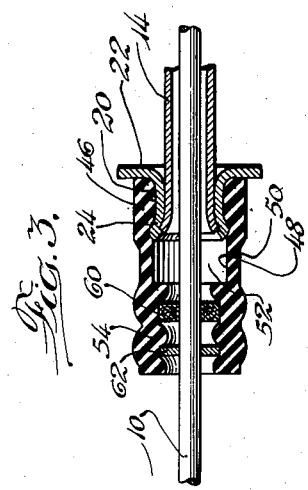
Inventor:
John Victor Stanley Dahlgren
By Hinkle, Horton, Ahlberg, Hausmann & Kuppers
Attorneys.

Patented Sept. 30, 1952

2,612,393

UNITED STATES PATENT OFFICE 2,612,393

SEALING GLAND

John Victor Stanley Dahlgren, Chicago, Ill., assignor to Stewart-Warner Corporation, Chicago, Ill., a corporation of Virginia Application March 7, 1947, Serial No. 733,161

1 Claim. (Cl. 286—16)

The present invention relates to cable or Bowden wire drives of the type which are enclosed in a sheath containing lubricant for reducing friction between the sheath and wire, and more particularly to an improved sealing gland for sealing the sheath to prevent the escape of lubricant therefrom.

Flexible cable or Bowden wire drives for transmitting longitudinal or rotary motion from a driving or control mechanism to a driven or controlled mechanism have heretofore been constructed enclosed within a sheath packed with lubricant so that loss of energy due to friction between the wire and its sheath is reduced to a minimum. Such a device for transmitting longitudinal movement is disclosed in the application of Homer F. Malone, Serial No. 591,467 filed May 2, 1945, and entitled Windshield Wipers, now Patent No. 2,568,922.

One disadvantage of these drives as presently constructed is the fact that lubricant tends to leak from the end of the sheath at the place where the driving cable or wire extends from the sheath. The present invention pertains to a sealing gland for sealing the end of the sheath which effects a leak proof connection between the gland and the sheath and between the gland and the Bowden wire so that leakage of lubricant is prevented.

Accordingly a primary object of the invention is the provision in a Bowden wire drive or the like that is enclosed within a sheath containing lubricant of a new and improved sealing gland for sealing the ends of the sheath to prevent leakage of lubricant from the sheath.

Another object of the invention is the provision in a Bowden wire drive or the like that is enclosed within a sheath containing lubricant of a new and improved resilient sealing gland engageable at one end over the end of the sheath and including means at the other end for slidably receiving the wire, the ends being deformed at these points of engagement so that the gland is held in position by its own resilience without other securing means and effectively seals the sheath against escape of lubricant therefrom.

A further object of the invention is the provision of a new and improved resilient sealing gland as set forth in the immediately preceding object, which includes a chamber formed between the ends of the gland for receiving lubricant leaking from the sheath and the film of lubricant which is carried out of the sheath by the wire drive and is cleared from the wire by the gland at the place where the wire extends through the gland.

A still further object of the invention is the provision in a Bowden wire drive or the like that is enclosed within a sheath filled with lubricant of a new and improved resilient gland that is exceedingly simple and inexpensive to construct and install, but which nevertheless is durable and entirely satisfactory in use.

These and other objects, advantages and capabilities of the invention will become apparent from the following description, taken in conjunction with the accompanying drawings, in which Fig. 1 is an elevational view on an enlarged scale and partly in section showing a Bowden wire drive incorporating the improved sealing gland of the present invention;

Fig. 2 is a longitudinal sectional view on an enlarged scale of the improved gland of the present invention;

Fig. 3 is a longitudinal sectional view on an enlarged scale of one end of a Bowden wire drive incorporating a modification of the improved sealing gland of the present invention; and Fig. 4 is a longitudinal sectional view on an enlarged scale of the modification shown in Fig. 3.

The exceedingly simple construction of the sealing gland of the present invention will become apparent from Figs. 1 and 2 wherein the numeral 10 indicates a Bowden wire driving element which is provided with an eye 12 on each end. When the drive is secured in position, one of these eyes will be releasably secured to a driving mechanism and the other will be secured to the mechanism to be driven. The arrangement shown is particularly suitable for transmitting reciprocatory movement and may be used, for example, as the driving connection between the actuating motor and the wiping blades of a windshield wiper.

As shown in Fig. 1, the Bowden wire is housed within a sheath 14 which extends between points adjacent the opposite ends of the wire and is provided along its length with a series of spaced annular grooves 16 that form bearing surfaces for the wire of small contact area. Conventionally the space in the sheath between the annular grooves 16 is filled with lubricant in order to further reduce friction between the wire and the sheath. The annular grooves tend to prevent escape of the lubricant in the sheath from between the annular grooves and an enlargement or washer 18 fixed on the wire 10 adjacent the end of the sheath tends to prevent lubricant from leaking out the end of the sheath, but these expedients are not entirely effective and after even a relatively short period of use, lubricant may begin to leak out of the end of the sheath.

The present invention is designed to contain and thus obviate this leakage and is also effective to prevent entrance of foreign material into the sheath. As shown in Fig. 1, a ferrule 20 having a flange 22 is secured upon the end of the sheath 14 with the flange spaced rearwardly from the end of the sheath. With the two parts held in position, the tip of the sheath and the ferrule are flared outwardly to form a bell shaped terminal 24, and the extreme forward edge of the ferrule is turned inwardly and engages the end of the sheath as shown so that the ferrule is fixedly secured with respect to the sheath. The sealing gland of the present invention is received over this bell shaped terminal 24 and abuts against the flange 22 on the ferrule, as shown in Fig. 1.

The sealing gland 26 is preferably formed from a resilient synthetic rubber-like material, such as Sirvene, and is of generally tubular shape and of uniform outer diameter as shown in Fig. 2. A series of concentrically arranged axially extending bores or chambers of different diameters are formed in the gland 26 as shown, dividing the gland into a forward end portion 28 having a bore 30, an intermediate portion 32, having a bore 34, and a rear end portion 36, having a bore 38. The bore 38 in the rear end portion of the gland conforms generally in shape to the shape of the terminal 24, but is of slightly smaller diameter throughout so that the gland will be stretched and deformed when this end is slipped over the terminal as indicated in Fig. 1. Because of the enlargement on the outer end of the terminal 24, the gland tightly grips the terminal forming a leakproof connection therewith, and upon movement of the wire driver 10 in a direction to the left, as seen in Fig. 1, the enlargement on the terminal and the fact that the gland is stretched prevents the gland from slipping off the terminal. When the driver is moved in the reverse direction, the end of the gland abuts against the flange 22 on the ferrule and thus prevents relative movement between the gland and sheath.

The bore 34 in the intermediate portion of the gland is of enlarged diameter relative to the bores 30 and 38 in the opposite end portions so that a chamber 40 is provided in the gland when it is in position as shown in Fig. 1 for containing any lubricant which may leak from the sheath 14 or which is removed from the wire driver 10. Because of the large diameter of the bore 34, the walls of the intermediate portion 32 are relatively thin so that this portion of the gland is flexible and may flex to a slight extent to the right and left as seen in Fig. 1 when the wire drive 10 is reciprocated in the sheath, if the fit between the wire 10 and bore 30 is too tight to permit easy sliding movement of the wire therethrough.

The bore 30 in the forward end portion 28 of the gland is of such diameter that its side walls snugly engage the sides of the Bowden wire drive 10 when the latter is inserted through the bore, and thus any lubricant which may adhere to the drive is cleared therefrom at the inner wall of this forward end portion. To further increase the cleaning action, the inward side of the front wall of the forward end portion is formed with an outwardly projecting spherical projection 42 and the outward side of this front wall is dished out slightly as indicated. When the wire driver 10 is moved to the left, as seen in Fig. 1, the peripheral edge of the projection 42 defining the bore 30 tightly engages and tends to cling to the wire driver so that any lubricant on the wire is cleared off and remains in the chamber 40.

The modification of the invention shown in Figs. 3 and 4 is generally similar to the gland just described. It is formed from a resilient synthetic rubber-like material and has a bore 44 in its rear end portion 46 conforming generally in shape to the bell shaped terminal 24 on the sheath 14 but of slightly smaller diameter so that the gland will be firmly held in position when it is slipped over the terminal in the same manner as described for the first embodiment. A bore 48 in the intermediate portion 50 of the gland is of enlarged diameter so that it forms a chamber 52 for containing the lubricant which leaks from the sheath and that lubricant which is cleared from the wire.

The modified gland is provided with a forward end portion 54 that has a bore 56 which is peripherally fluted so that a series of annular grooves 58 are formed therein for a purpose which will be described hereinafter. This modified gland is secured on the sheath in the same manner as the gland previously described, but the bore 56 in the forward end portion of the gland does not directly engage the wire drive. Instead the wire is passed through a packing ring assembly comprising a ring 60 of leather, fiber or other suitable material, and a metallic ring 62, and these rings are squeezed into the grooves 58 in the bore 56. The rings 60 and 62 are of larger diameter than the bore 56 so that the forward end portion 54 is deformed as indicated when the rings are inserted therein and the rings are thereby firmly held in position.

The central aperture in the leather ring 60 through which the wire driver passes is of such diameter that the sides of the wire are firmly engaged and as a result any lubricant adhering to the wire when it moves to the left, as seen in Fig. 3, is cleared from the wire and is retained in the chamber 52. An advantage of this form of the invention resides in the fact that the packing ring assembly may be removed and replaced when it becomes worn so that it is not necessary to replace the entire gland.

Although the invention has been described as applied to a windshield wiper driving mechanism, it may be used wherever Bowden wires are utilized for transmitting motion from a driving to a driven mechanism. For example, it may find application in carburetor chokes, radio antennae and raditor shutters, to mention but a few applications.

While the present invention has been illustrated and described in connection with specific structural details, it should be understood that these are not intended to be limitative of the invention except in so far as set forth in the accompanying claim.

Having thus described my invention, what I claim as new and desire to secure by Letters Patent is:

A gland to seal the end of the housing for a Bowden wire or like driving connection which housing has flaring terminals at its opposite ends from which the wire projects, said sealing gland comprising an elastic rubber-like body member having a rear end portion with an axially extending bore conforming generally to the shape of said terminal but of smaller diameter throughout its length and terminating at its inner end in a portion of increasing diameter, the forces engendered by the inherent elasticity of said body member when said rear end is forced over said terminal being sufficient to form a seal therewith and to hold the body member on said terminal, a tubular intermediate portion forming a continuation of the inner end of said rear end portion to provide a chamber surrounding said wire, and a forward end portion forming a forward end wall for said chamber including a centrally located nipple-like projection extending axially toward said rear end portion and having an axial bore adapted closely to surround said wire, the bore being flared at its front end to facilitate rearward movement of the wire, said nipple-like projection forming a wiping edge to clear material from the wire when it is moved outwardly of the sealing gland and being tapered to direct the said material outwardly of the wire, the nipple-like projection being substantially shorter than its base diameter and said forward end portion being substantially thicker in an axial direction than the axial length of the nipple-like projection, for efficient wiping, the said body member being sufficiently resistant to deformation to resist movement of said forward end portion with said wire.

JOHN VICTOR STANLEY DAHLGREN.

REFERENCES CITED

The following references are of record in the file of this patent:

UNITED STATES PATENTS

| Number | Name | Date |
|---|---|---|
| 1,510,806 | Snider | Oct. 7, 1924 |
| 1,603,556 | Platt et al. | Oct. 19, 1926 |
| 1,697,516 | Hele-Shaw et al. | Jan 1, 1929 |
| 1,745,345 | Anderson | Feb. 4, 1930 |
| 1,871,351 | Wentz | Aug. 9, 1932 |
| 2,083,937 | Begg | June 15, 1937 |
| 2,170,915 | Schweitzer | Aug. 29, 1939 |
| 2,321,250 | Russell | June 8, 1943 |